(12) United States Patent
McElhaney et al.

(10) Patent No.: US 11,234,378 B2
(45) Date of Patent: Feb. 1, 2022

(54) IMAGE BASED IRRIGATION CONTROL

(71) Applicant: FPL Smart Services, LLC, Juno Beach, FL (US)

(72) Inventors: Patrick G. McElhaney, Jupiter, FL (US); Christine S. Donayri, Jupiter, FL (US)

(73) Assignee: FPL Smart Services, LLC, June Beach, FL (US)

( * ) Notice: Subject to any disclaimer, the term of this patent is extended or adjusted under 35 U.S.C. 154(b) by 322 days.

(21) Appl. No.: 16/385,990

(22) Filed: Apr. 16, 2019

(65) Prior Publication Data
US 2020/0329652 A1   Oct. 22, 2020

(51) Int. Cl.
*A01G 25/16* (2006.01)
*G06K 9/00* (2006.01)
(Continued)

(52) U.S. Cl.
CPC ....... *A01G 25/165* (2013.01); *G06K 9/00657* (2013.01); *G06K 9/00771* (2013.01);
(Continued)

(58) Field of Classification Search
CPC .. A01G 25/16; A01G 25/165; G06K 9/00657; G06K 9/00771;
(Continued)

(56) References Cited

U.S. PATENT DOCUMENTS 5,465,904 A   11/1995   Vaello
7,349,763 B2   3/2008   Ivans
(Continued)

FOREIGN PATENT DOCUMENTS

WO   2015173825   11/2015
WO   2017066830   4/2017
(Continued)

OTHER PUBLICATIONS

Bhagyalaxmi, Agricultural Robot (Irrigation System, Weeding, Monitoring of Field, Disease Detection), International Journal of Innovative Research in Computer and Communication Engineering vol. 4, Issue 3, Mar. 2016.
(Continued)

*Primary Examiner* — William C Vaughn, Jr.
*Assistant Examiner* — Naod W Belai
(74) *Attorney, Agent, or Firm* — Fleit Intellectual Property Law; Jeffrey N. Giunta

(57) ABSTRACT

Systems and methods to control irrigation. An image of an area of vegetation is received from a video camera supporting security monitoring wherein the video camera provides image data to both a security monitoring system and an irrigation control system. Vegetation is identified in the image based on processing the image's pixel information. Respective colors of the vegetation are determined by further processing color information within the pixel information depicting the vegetation. Based on the respective color of the vegetation, a respective irrigation state of the vegetation is determined. An irrigation need is determined based on the respective determined irrigation state of the vegetation. Irrigation is provided to the vegetation independently of a set irrigation schedule.

17 Claims, 9 Drawing Sheets

(51) Int. Cl.
*G06T 7/90* (2017.01)
*G06T 7/00* (2017.01)
*H04N 5/247* (2006.01)

(52) U.S. Cl.
CPC .......... *G06T 7/0002* (2013.01); *G06T 7/0012* (2013.01); *G06T 7/90* (2017.01); *H04N 5/247* (2013.01); *G06T 2207/10016* (2013.01); *G06T 2207/10024* (2013.01); *G06T 2207/30188* (2013.01); *G06T 2207/30192* (2013.01); *G06T 2207/30232* (2013.01)

(58) Field of Classification Search
CPC . G06T 2207/10016; G06T 2207/10024; G06T 2207/30188; G06T 2207/30192; G06T 2207/30232; G06T 7/0002; G06T 7/0004; G06T 7/0012; G06T 7/90
See application file for complete search history.

(56) References Cited

U.S. PATENT DOCUMENTS

| | | | |
|---|---|---|---|
| 8,209,061 B2 | 6/2012 | Palmer et al. | |
| 8,359,142 B2 | 1/2013 | Hoffman et al. | |
| 8,989,907 B2 | 3/2015 | Schmidt et al. | |
| 9,504,213 B2 | 11/2016 | Levine et al. | |
| 9,886,016 B2 | 2/2018 | Bermudez et al. | |
| 2007/0016334 A1 | 1/2007 | Smith et al. | |
| 2013/0085619 A1 | 4/2013 | Howard | |
| 2014/0173769 A1 | 6/2014 | Leyns et al. | |
| 2015/0309496 A1 | 10/2015 | Kah et al. | |
| 2016/0202679 A1* | 7/2016 | Bermudez Rodriguez | G05B 15/02 700/284 |
| 2017/0112079 A1 | 4/2017 | Eyring et al. | |
| 2017/0172077 A1 | 6/2017 | Wouhaybi et al. | |
| 2017/0172080 A1 | 6/2017 | Bermudez et al. | |
| 2017/0223912 A1 | 8/2017 | Gagne et al. | |
| 2017/0238484 A1 | 8/2017 | Arumugam | |
| 2017/0286772 A1 | 10/2017 | Workman et al. | |
| 2017/0325398 A1 | 11/2017 | Heinrich et al. | |
| 2017/0357230 A1 | 12/2017 | Bermudez et al. | |
| 2017/0367276 A1 | 12/2017 | Itzhaky et al. | |
| 2018/0213731 A1 | 8/2018 | Wykman et al. | |

FOREIGN PATENT DOCUMENTS

| | | |
|---|---|---|
| WO | 2017148818 | 9/2017 |
| WO | 2017203530 | 11/2017 |

OTHER PUBLICATIONS

Vibhute, et al., Applications of Image Processing in Agriculture: A Survey, International Journal of Computer Applications, vol. 52 No. 2, Aug. 2012.

Schepelmann, A., Identification & Segmentation of Lawn Grass Based on Color and Visual Texture Classifiers, Ohiolink.edu, Aug. 2010.

* cited by examiner

IMAGE BASED IRRIGATION CONTROL

FIELD OF THE DISCLOSURE

The present disclosure generally relates to controlling irrigation systems, and more particularly to controlling irrigation systems for vegetation based on processing of images that include the vegetation.

BACKGROUND

Areas of vegetation, such as lawns and hedges planted around various buildings or on various types of properties, often have artificial irrigation systems to supplement natural rainfall and provide the vegetation with an adequate supply of water. Such areas of vegetation will undesirably change color and are able to be harmed if they do not receive an adequate supply of water.

Artificial irrigation systems often have a controller that includes an automatic timer. The controller is programmed to periodically turn on the flow of water or other irrigation fluid to the irrigation heads of the artificial irrigation system. Many controllers operate artificial irrigation systems according to a schedule that does not take into account natural rainfall. Some such controllers are configured to provide a fixed amount of water on a set schedule independently of natural rainfall. Other controllers either received forecasted estimates of rainfall in the area or monitor moisture sensors that detect the presence of moisture in a collection vessel that collects rainwater. In an example, existing systems will determine if rain is forecast for a day in which irrigation is scheduled, and if rain is forecasted the scheduled irrigation is not performed on that day. These monitoring techniques provide indirect indications of rainfall onto an area of vegetation and may result in providing excessive and/or unnecessary artificial irrigation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
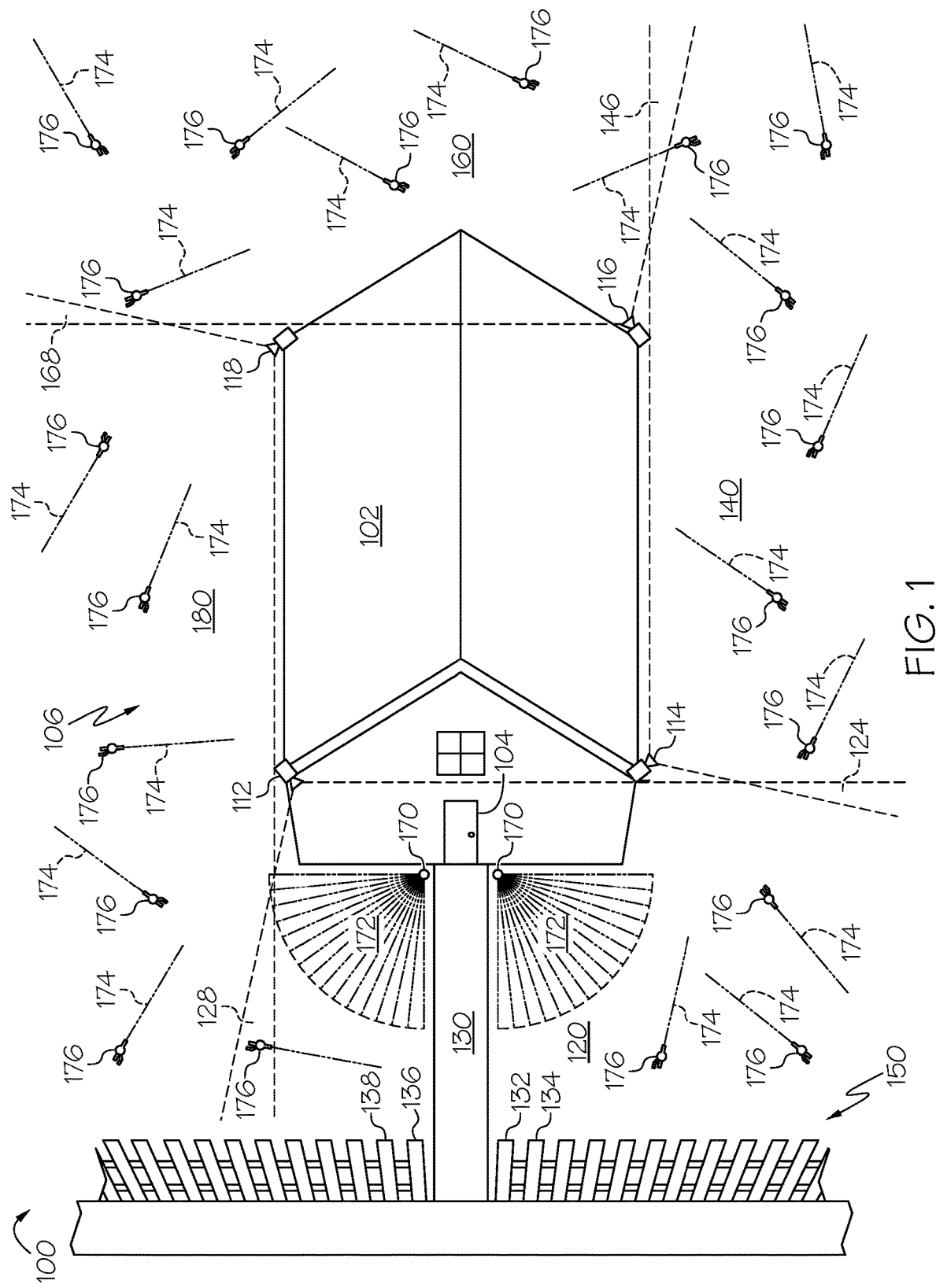
FIG. 1 illustrates an aerial view of a premise with an automated irrigation system selectively irrigating multiple areas, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide irrigation control that automatically adjusts an amount of irrigation fluid that is delivered to an area of vegetation based on image processing of images of the area of vegetation. Irrigation fluid in various examples is able to include water, water mixed with nutrients or other chemicals, other fluids, or combinations of these. In an example, the images are captured by one or more cameras that also provide images to a security system that are used to visually monitor an area being protected. Image processing is performed on the images received from these one or more cameras in order to determine irrigation needs for vegetation, such as lawns, bushes, or the like, that are captured in those images. Adding the support of irrigation control processing as a new function for security cameras advantageously allows improved irrigation system efficiencies without an additional cost of providing dedicated cameras. In some examples, an artificial irrigation system, such as a lawn sprinkler system or any type of artificial irrigation system, is completely controlled based on the irrigation needs determined by processing the received images and no defined irrigation schedule is required to be configured or maintained within the irrigation system.

In an example, processing of images capturing vegetation determines an irrigation state that vegetation. In the following discussion, irrigation state broadly refers to the state of the vegetation with regards to needing water and in an example ranges from receiving too much irrigation, receiving a sufficient amount of irrigation, to receiving too little irrigation. Processing of the images in some examples also evaluates the color and in an example also evaluates the length of vegetation growth to determine the irrigation state and associated watering requirements of the vegetation. In some cases, the amount of irrigation fluid delivered to different portions of an area is able to be dynamically adjusted, such as by varying the amount of time irrigation fluid is deployed to different zones, varying frequency of irrigation, implementing other variations, or combinations of these.

In some examples, determining irrigation needs by processing images received from one or more outdoor cameras, such as cameras that are already in place or that are to be installed around a property to support security monitoring, is able to eliminate a need to establish an explicitly defined watering schedule to be implemented by the artificial irrigation system. In some examples, the below described system and methods are also able to incorporate additional information to determine an amount of artificial irrigation that is to be provided and to also determine when that artificial irrigation is to be provided. For example, the below described systems and methods are able to adjust an amount of irrigation provided at a particular time based on forecasted rain fall and measured ambient temperatures in the specific geographic area of the vegetation being monitored.

Information about the particular area of vegetation is also able to be incorporated into determining an amount of irrigation to provide. In some examples, information regarding soil composition, water requirements for the particular type of vegetation present in the area, types of irrigation equipment such as types of sprinkler heads used on different portions of the area being irrigated, other information, or combinations of these, is provided to the system. In some examples, this information is also able to support processing of images of the area being irrigated, support determinations of how long to activate artificial irrigation systems, support other processing, or combinations of these.

In an example, a system may be configured with, or able to determine via various techniques, the geographical location of the vegetation to be irrigated and based on that geographical location, soil composition, likely rainfall amounts, other geographically specific information, or combinations of these, can be determined. Such geographically determined information can be incorporated into determining irrigation needs for the vegetation being monitored.

In some examples, processing of images received from one or more cameras is able to estimate the intensity and duration of rain events or an amount of irrigation fluid provided by the artificial irrigation system and correspondingly reduces the amount of artificial irrigation that is to be provided. In addition, these systems and methods are able to check any local watering restrictions, such as by internet queries or the like, to ensure that operation of the artificial irrigation system remains compliant with municipal rules and regulations by not watering during times of restrictions.

In various examples, an irrigation control system is able to activate an artificial irrigation system to provide irrigation to areas of vegetation according to various criteria and conditions. In various example the irrigation control system does not have a preset schedule for artificial irrigation. In an example, when and how much artificial irrigation that is to be provided to an area of vegetation is determined based on colors of the vegetation as determined from processing images captured by one or more cameras. In addition to detecting colors of the vegetation, other characteristics of the vegetation such as the length of the vegetation (e.g., grass) are also considered in determining when and how much artificial irrigation is to be supplied in some examples. In some examples, forecasts of rainfall in the near future are able to be obtained by the irrigation control system and amounts of irrigation may be reduced if some rainfall is expected in the near future.

In some examples, processing of the received images during artificial irrigation is able to identify malfunctioning irrigation equipment such as identifying broken watering heads, identifying if a head is not extending properly, any malfunction, or combinations of these. In some examples, processing of the received images is able to estimate an amount of water delivered to the vegetation by assessing the intensity and duration of irrigation events such as by evaluating the intensity and duration of natural rainfall, evaluating the pattern, intensity, and duration of water delivered by an artificial irrigation system, or combinations of these.

In some examples, processing of images received from a motion detecting camera is able to detect the entry of unwanted persons or animals into an area covered by an artificial irrigation system. In an example, received images are processed to identify if a person, animal, or other unauthorized entrant is in the image. Further processing is able to determine if the person, animal, or entrant is not recognized or is otherwise determined to be an unauthorized entrant into the area. In the case of an unauthorized entrant, the artificial irrigation system could, for example, initiate watering for a set number of minutes after a defined time interval following determination of the unauthorized entrant in order to deter or drive away the unwanted person or animal.

In various examples, different numbers of cameras can be used to support the operations of the irrigation control system. In one example, a number of cameras that provide images that cover an entire area that is provided with artificial irrigation under the control of the irrigation control system allows monitoring of different portions of the area to be provided with artificial irrigation. In such an example, different amounts of artificial irrigation are able to be provided to the different portions of the area. The images from these cameras are also able to also support estimating an amount of rainfall that occurs in the area, estimate the amount of artificial irrigation being provided by the artificial irrigation system, and other processing supported by having images of the entire area in which the artificial irrigation system operates as is described in further detail below.

In another example, one camera or more camera(s) that capture images of only part of the entire area that is provided with artificial irrigation are able to support processing to, for example, estimate an amount of rainfall that has occurred in the area by processing images captured during rainfall and determining blurriness of components in the image. Processing of images that are captured by one or a number of camera(s) that only cover part of the entire area that is provided with artificial irrigation are also able to estimate an irrigation state of vegetation that is within the view of the one or more camera(s). Based on processing of those images, artificial irrigation is able to be provided based on the determined irrigation state of that portion of vegetation whose image is captured. An example of one or more camera(s) that do not provide images of the entire area that is provided artificial irrigation is a camera that is located at the door of a residence or other building to allow a person to see persons at the door.

FIG. 1 illustrates an aerial view of a premise 100 with an automated irrigation system selectively irrigating multiple areas, according to an example. The aerial view of a premise 100 depicts a building 102 that is surrounded by an area 106 that includes a lawn. The illustrated aerial view of a premise 100 shows four (4) portions of the area 106 that includes the lawn, a first portion 120, a second portion 140, a third portion 160 and a fourth portion 180.

The each of the portions of this area 106 has artificial irrigation components to provide irrigation to vegetation located in those portions. In general, each portion has one or more irrigation sprinkler zones that disperse water, or other irrigation fluid, to vegetation in all of these portions. In the following discussion, the components of an artificial irrigation system that disperse water over vegetation are referred to as sprinkler heads. In general, the water flow to the sprinkler heads is controlled by a number of valves, with each valve controlling water flow to a particular subset of sprinkler head. A subset of sprinkler heads that is controlled by the same valve is referred to as an irrigation sprinkler zone.

The depicted area 106 is shown to have a number of broadcast sprinkler heads 174 that each projects a respective water stream 176 when providing irrigation to the area 106. These broadcast sprinkler heads 174 in an example vary the direction of their respective water stream 176 over time to provide a broad area of irrigation coverage for each broadcast sprinkler head. The depicted first portion 120 of area 106 is shown to include area sprinkler heads 170 that each has an area spray pattern 172. In the depicted example, the area sprinkler heads 170 have a one quarter (¼) circle spray pattern 172. In general, any number of different sprinkler heads that are able to be of any number of different types are able to be dispersed across an area 106 that is to be irrigated.

In the illustrated aerial view of the premise 100, the building 102 has four (4) cameras that each captures images of a respective portion of the area 106 that includes the lawn. A first camera 112 captures images of the first portion 120, a second camera 114 captures images of the second portion 140, a third camera 116 captures images of the third portion 160 and fourth camera 118 captures images of the fourth portion 180. In the illustrated example, the cameras capture images that overlap with each other. As shown, the first portion 120 and the second portion 140 have a first overlap area 124 that is captured by both the first camera 112 and the second camera 114. The second portion 140 similarly overlaps with the third portion 160 in a second overlap area 146 that is captured by both the second camera 114 and the third camera 116. The third portion 160 overlaps with the fourth portion 180 in a third overlap area 168 that is captured by both the third camera 116 and the fourth camera 118. The first portion 120 also overlaps with the fourth portion 180 in a fourth overlap area 128 that is captured by both the first camera 112 and the fourth camera 118. In an example, each of these cameras provides a time sequence of images of their respective portions of the area 106 to various systems to support the operations of those systems. In an example, these cameras operate together to capture images of all vegetation on the premises in the area 106.

In an example, these cameras each provide a time sequence of images of the area 106 that surrounds the building to a security monitoring system. Such a security monitoring system is able to use the received time sequences of images from each of these cameras for any suitable purpose. For example, a security system is able to record these images to capture any suspicious or unauthorized activity that occurs near the building 102. In some examples, the security system is able to display received time sequences of images on one or more monitors to support observation by security personal of the area 106 that surrounds the building. As described in further detail below, images captured by these cameras, including in some examples a time sequence of images, are received and processed by an artificial irrigation control system to determine irrigation needs of vegetation in the area 106.

The illustrated building 102 has a front door 104 that is adjacent to a walkway 130 that leads to a fence 150 at the front of the area 106. In general, the fence 150 has a number of posts to support the fence and the fence extends along the entire front of the area 106 and may extend around part or all of the area 106. In order to more clearly and concisely present and describe the relevant parts of the below described system and methods, a subset of the posts of the fence 150 are depicted and described herein. The aerial view of the premise 100 depicts a first fence post 132, a second fence post 134, a third fence post 136 and a fourth fence post 138.

Figure 2:
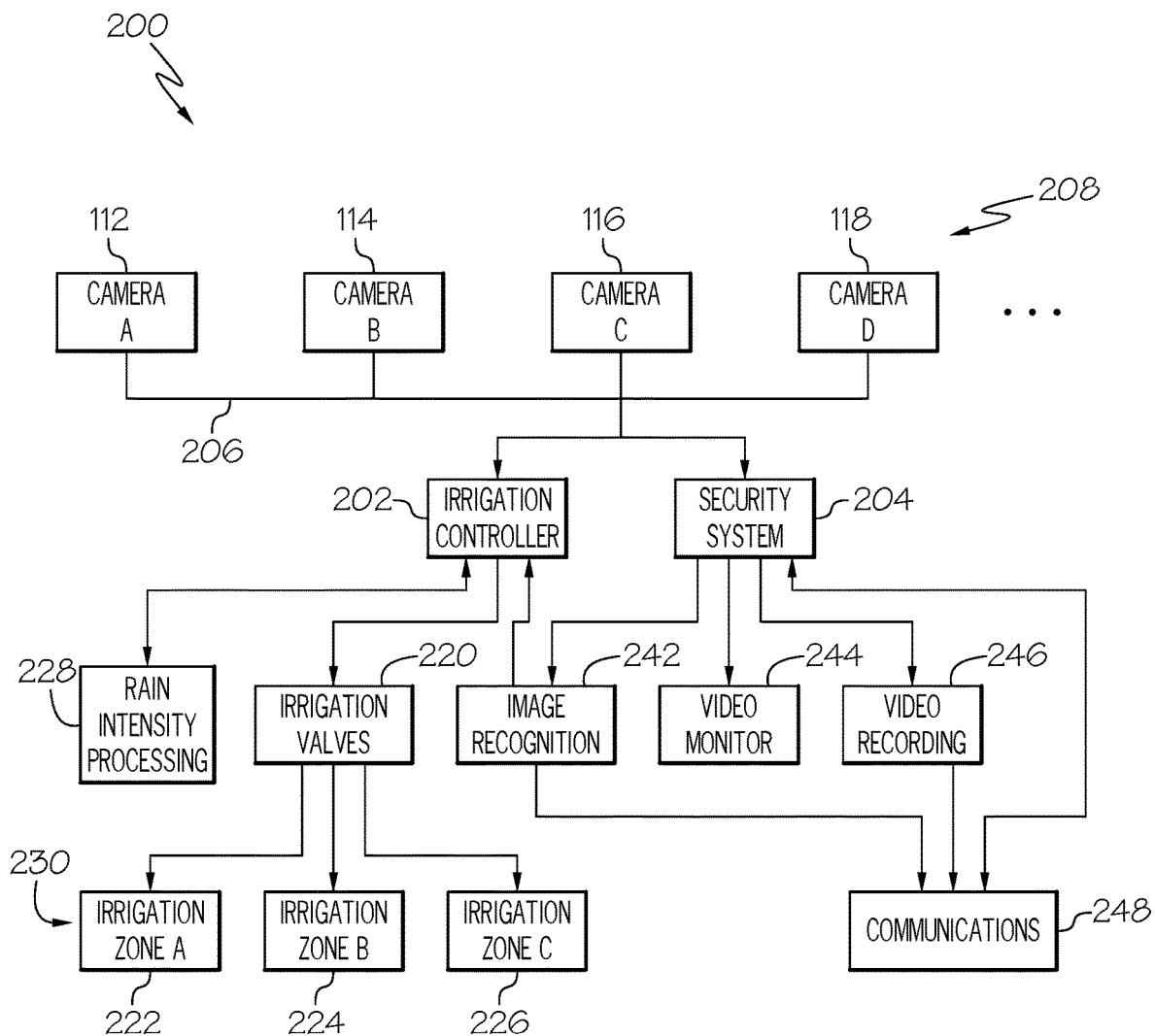
FIG. 2 illustrates a block diagram of an interoperating security system and automated irrigation control system, according to an example.

FIG. 2 illustrates a block diagram of an interoperating security system and automated irrigation control system 200, according to an example. The description of the block diagram of the interoperating security system and automated irrigation control system 200 refers to the above described aerial view of the premise 100. The block diagram of an interoperating security system and automated irrigation control system 200 depicts an example of components that are included in a system to monitor the area 106 described above with regards to the aerial view of the premise 100 to support both security monitoring and the control and delivery of artificial irrigation. The interoperating security system and automated irrigation control system 200 in an example includes components that make up an irrigation control apparatus.

The block diagram of an interoperating security system and automated irrigation control system 200 includes area monitoring cameras 208, which in this example includes the four (4) cameras discussed above: the first camera 112, second camera 114, third camera 116 and fourth camera 118. In an example, these cameras 208 are each a video camera supporting security monitoring of a premises. These cameras 208 in the illustrated example communicate electrically a video camera interface of an irrigation controller 202 and a security system 204 via a camera data bus 206. In general, the camera data bus 206 supports communications of image data from each of the cameras 208 to the irrigation controller 202 and the security system 204, and also supports communicating commands or other information to any or all of the cameras 208 from either or both of the irrigation controller 202 or the security system 204. In further examples, the cameras 208 are able to communicate with the security system and the irrigation controller via any suitable communications architecture.

The security system 204 in an example includes functions to support security operations that include visually monitoring the area 106 of the premises. The security system 204 provides images that were received from the cameras 208 to various processing components. The illustrated security system 204 provides images to an image recognition processing component 242. In an example, the image recognition processing component 242 is an image processor that performs image processing to recognize persons or animals that are present in the images captured by and received from one or more of the cameras 208. In an example, indications of the recognition of persons or animals in images received from the cameras 208 are provided to the irrigation controller 202 for processing as is described in further detail below.

The security system 204 further provides images received from the cameras 208 to video monitors 244. Video monitors 244 present the images in any suitable format to allow visual observation of the area 106 by a guard or other person to identify any suspicious or unauthorized activity. The security system 204 also provides images received from the cameras 208 to a video recording component 246 for recording and later observation. A communications system 248 supports communications of data between various components, such as the security system 204, the image recognition processing component 242 and the video recording component 246, and external elements (not shown).

The irrigation controller 202 receives images from the cameras 208 and processes those images as described in further detail below to support controlling an irrigation system to provide a proper amount of irrigation to vegetation that is captured in the received images. The irrigation controller 202 provides images to a rain intensity processing component 228. The rain intensity processing component 228 in an example processes images to determine blurriness in the image to estimate an intensity of rainfall. In some examples, the rainfall intensity processing component processes images to estimate the intensity of not only natural rainfall but also the amount of water flowing from irrigation equipment to estimate and confirm the amount of water being delivered by the irrigation equipment.

The irrigation controller 202 in an example controls irrigation valves 220. The irrigation valves 220 control water flow to different irrigation zones 230. In an example an artificial irrigation system has a number of valves that each control water flow to a respective irrigation zone. The depicted example has three (3) zones, an irrigation zone A 222, and irrigation zone B 224, and an irrigation zone C 226. Each of these zones are controlled by a separate valve in the irrigation valves 220, and each of those valves are individually controlled by the irrigation controller 202.

Figure 3:
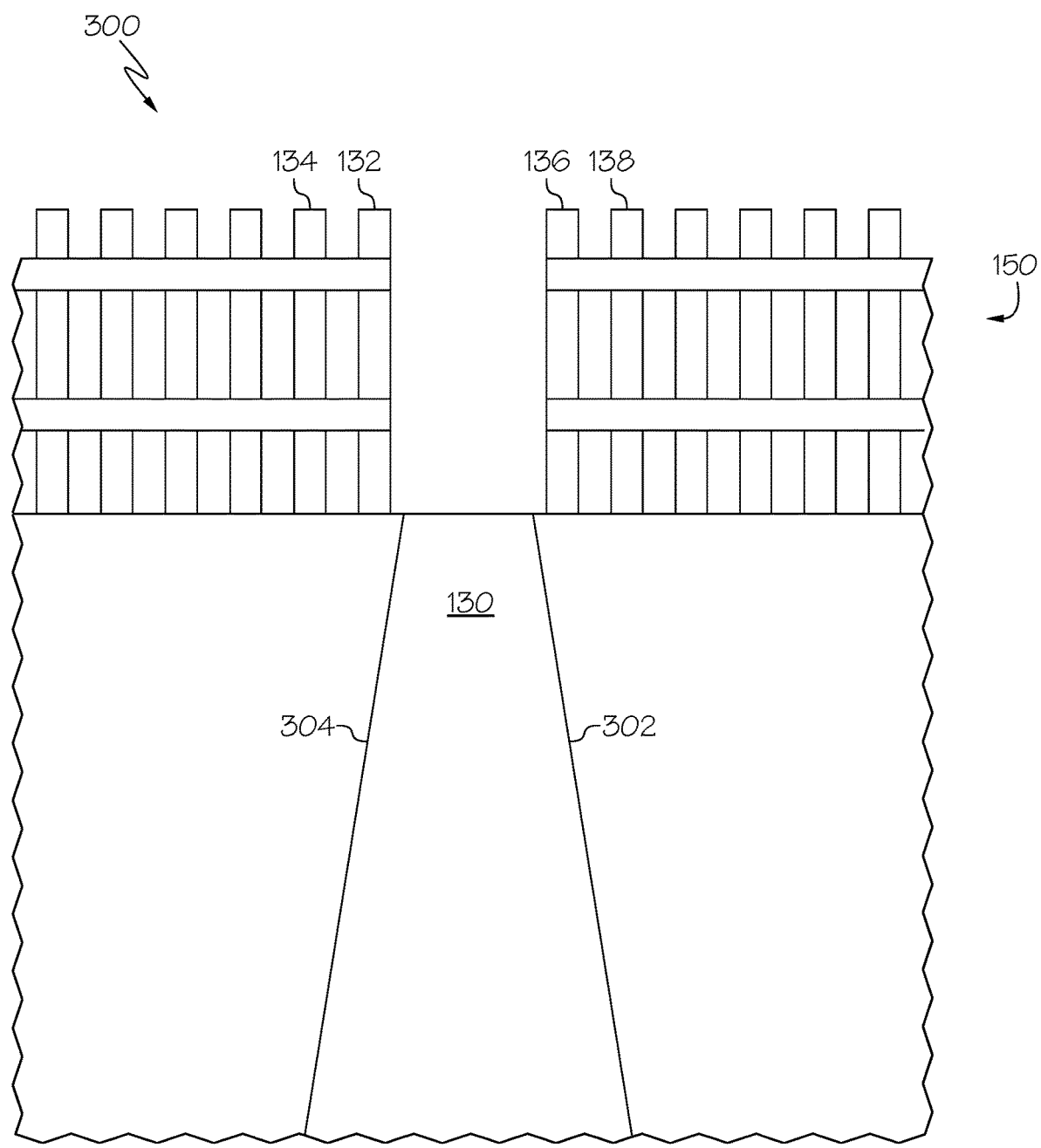
FIG. 3 illustrates a rain-free view captured by a camera of an area that includes fixed objects.

FIG. 3 illustrates a rain-free view captured by a camera 300 of an area that includes fixed objects. Reference is made to the aerial view of the premise 100 and the door 104, walkway 130 and fence 150 depicted therein. The rain-free view captured by a camera 300 is an example of an image captured by a camera (not shown) located above the door 104 that captures an image of the walkway 130 and part of the fence 150, including the first fence post 132, the second fence post 134, the third fence post 136, and the fourth fence post 138. The rain-free view captured by a camera 300 is an example of an image that is within a first time sequence of images of a particular scene.

The rain-free view captured by a camera 300 in this example is captured during a time where there is no rainfall or other irrigation occurring within that captured image. The walkway 130 that is captured in the rain-free view captured by a camera 300 has edges that are straight lines, which corresponds to the straight lines of the actual walkway 130. The edges of the first fence post 132, the second fence post 134, the third fence post 136, and the fourth fence post 138 are also straight lines, as are the cross members of fence 150.

Figure 4:
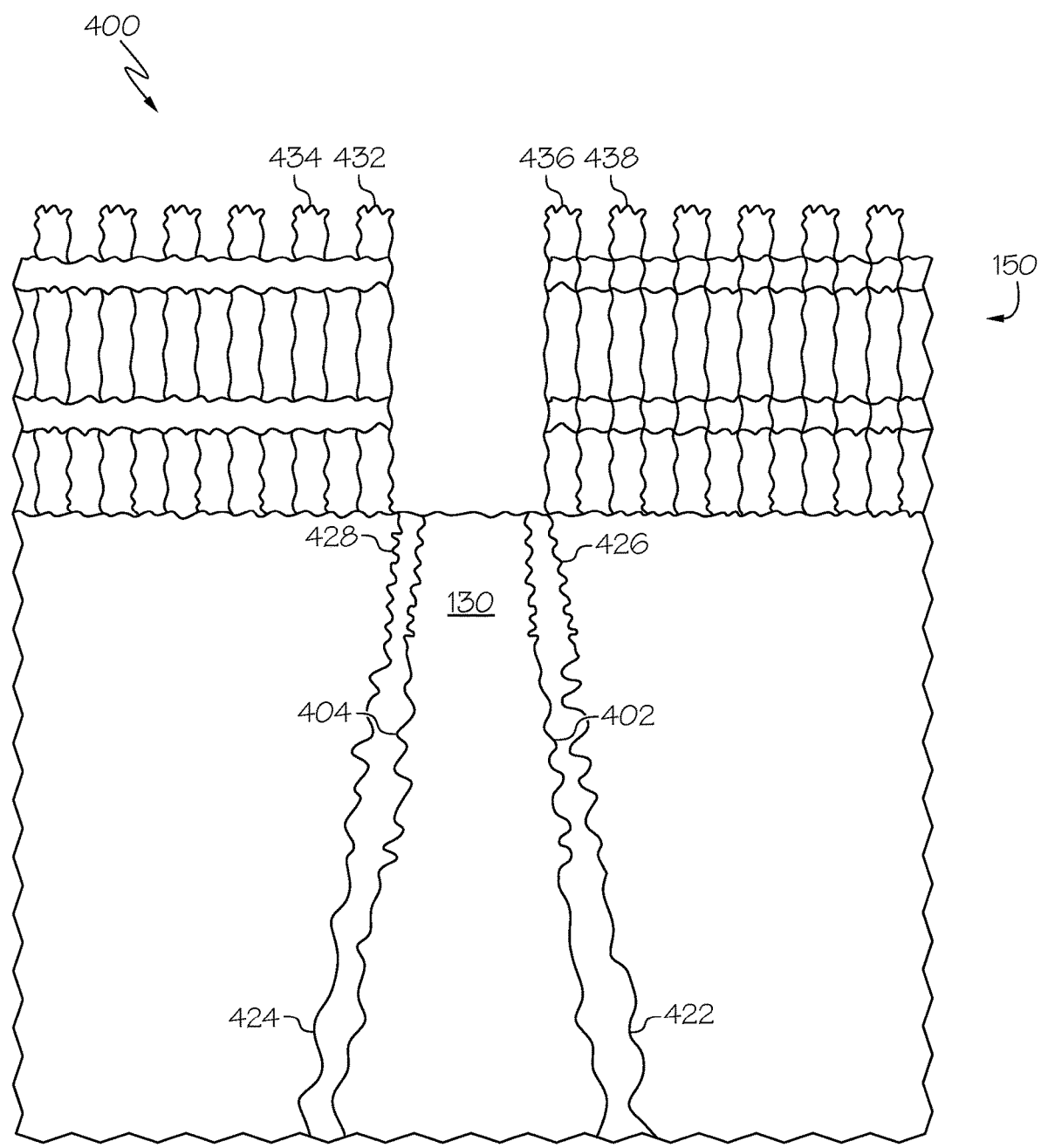
FIG. 4 illustrates a view captured by the camera during rainfall of the area that includes the several fixed objects depicted in FIG. 3.

FIG. 4 illustrates a view captured by the camera during rainfall 400 of the area that includes the several fixed objects depicted in FIG. 3. The view captured by a camera during rainfall 400 is an example of an image that is within a second time sequence of images of the particular scene that was also captured by the rain-free view captured by a camera 300. The view captured by the camera during rainfall 400 is an example of an image captured during rainfall in the area of the walkway 130 and fence 150. The rainfall causes the captured images of the walkway 130 and fence 150 to become blurry due to the optical distortion caused by the rainfall. It is understood that as the intensity of rainfall increases, the image of the elements captured by a camera become more blurry, and that blurriness observed during a rainfall event increases with the distance between the observed object and the camera.

The view captured by the camera during rainfall 400 in this example shows that the edges of the walkway become more blurry at points that are farther away from the camera. For example, the depicted walkway right edge 402 and walkway left edge 404 are shown to become successively blurry as the walkway 130 extends away from the door. A walkway near right edge 422 and walkway near left edge 424 are shown to be almost straight, while a walkway far right edge 426 and walkway far left edge 428 are shown as being more blurry. The edges of the first fence post 132, the second fence post 134, the third fence post 136, and the fourth fence post 138 are also shown to be a blurry as straight lines, as are the cross members of fence 150.

In an example, image processing is able to compare images captured during periods without rain, such as the above described rain-free view captured by a camera 300, with images captured during periods of rain, such as the present view captured by the camera during rainfall 400. Images captured during periods without rain are able to be autonomously identified because edges of objects in those images are consistent over time. In some examples, it may also be assumed that most images are captured during periods without rain. Images captured during periods of rain are able to be autonomously identified by noting that the edges of objects become blurry in comparison to the more consistent edges of those object that are captured in images without rain.

In some examples, the distance between a point on an observed object and the camera capturing the image of that object is able to be estimated based on the amount of blurriness that is observed at that point of the object, particularly when comparisons are made between the levels of blurriness in images captured during different rain intensities. In an example, the increase in blurriness with distance of an observed point on an edge in the image is able to be used to refine the estimate of rainfall rate at the time of image collection. In an example, heuristically determined relationships between blurriness and estimated distances are used to support estimating rainfall rate in the captured images.

Figure 5:
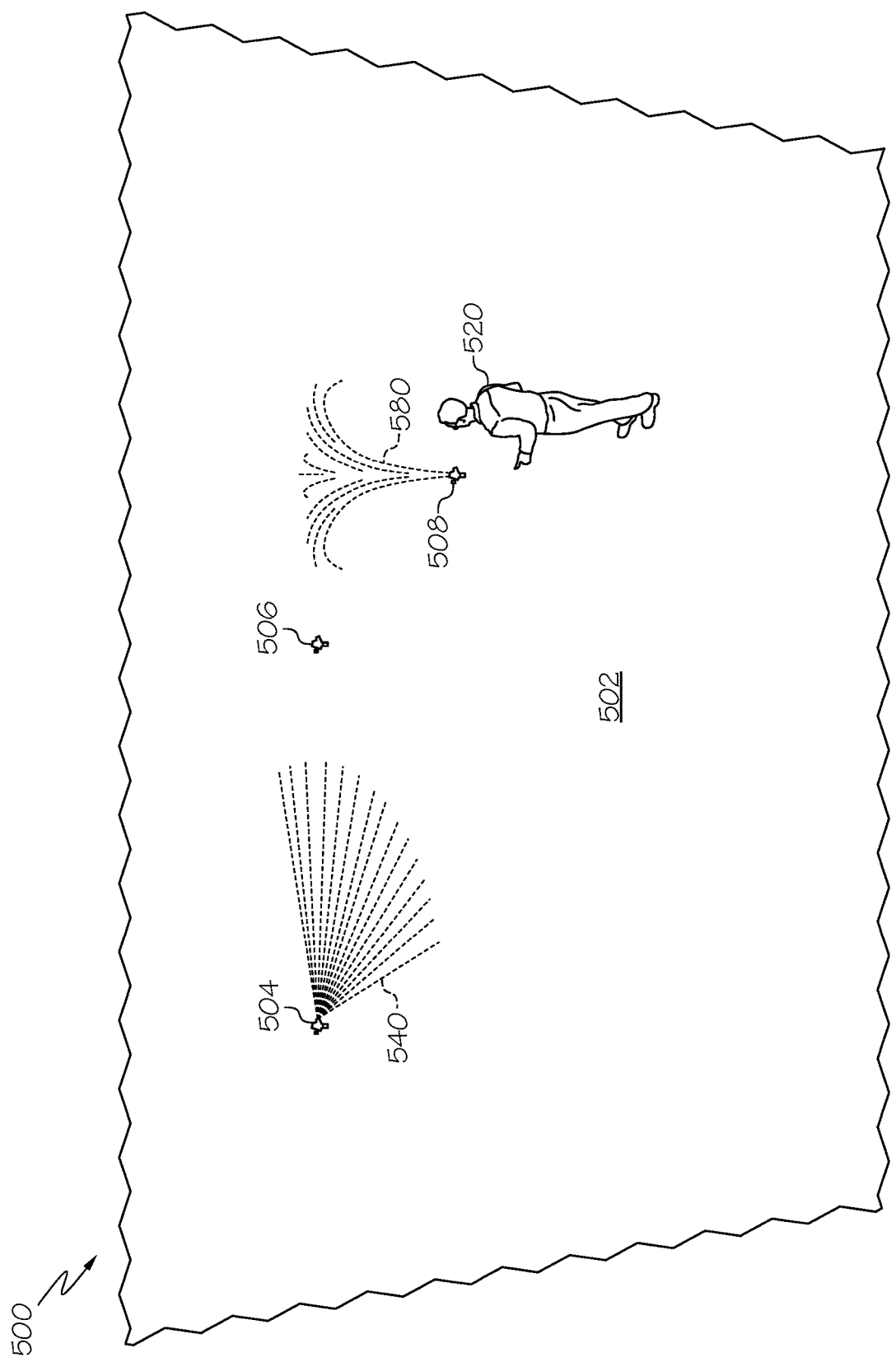
FIG. 5 illustrates an image captured of an area during irrigation that depicts irrigation components in operating condition and other irrigation components with example failures, according to an example.

FIG. 5 illustrates an image 500 captured of an area during irrigation that depicts irrigation components in operating condition and other irrigation components with example failures. Reference is made to the interoperating security system and automated irrigation control system 200 discussed above. The image 500 captured of an area during irrigation is an example of an image captured by a camera while the irrigation controller 202 is providing water to an irrigation zone within the view of the captured image. As an example For example, a camera capturing an image of a portion of an area that is irrigated by Irrigation Zone A 222 while that zone is operating is able to evaluate the operation of the irrigation equipment in that zone.

The image 500 captured of an area during irrigation depicts an area 502 that has several irrigation sprinkler heads. The area 502 the area includes a first sprinkler head 504, a second sprinkler head 506, and a third sprinkler head 508. The captured image shows that the first sprinkler head 504 has a proper irrigation spray pattern 540, the second sprinkler head 506 has no water flow, and the third sprinkler head 508 has a broken spray pattern 580.

In an example, image processing of the image 500 is able to be used to identify whether particular sprinkler heads are operating properly or are malfunctioning. Image processing is able to identify the proper irrigation spray pattern 540 produced by the first sprinkler head 504 as a regular operating irrigation spray image, and thus categorizes the first sprinkler head 504 as properly operating.

Image processing is able to identify that no water flow is being produced by the second sprinkler head 506 and that a broken spray pattern 580 is being produced by the third sprinkler head 508. In an example, an irrigation controller 202 is able to receive images of the area 502 over a long period of time, such as over days, months, or longer, during operations of the irrigation zone or zones for that area 502. Processing of those images over time, which includes time after maintenance of the irrigation system and all sprinkler heads are operating, allows the proper irrigation spray pattern for each sprinkler head to be observed and stored by the irrigation controller 202. By comparison of images captured of the area 502 during operations of the irrigations zones providing irrigation to that area 502 allows differences in the images of spray patterns to be identified as a failed irrigation spray image, such as the no spray from the second sprinkler head 506 and the broken spray pattern 580 from the third sprinkler head 508, and thereby by identify the second sprinkler head 506 and third sprinkler head 508 as irrigation component failures. In an example, these irrigation component failures are reported to maintenance personnel as failed irrigation components.

In an example, image processing of images captured of the proper irrigation spray pattern 540 produced by the first sprinkler head 504 is able to estimate an amount of irrigation fluid being deployed by the first sprinkler head. In an example, the image 500 is an irrigation flow detection image and similar to that described above with regards to view captured by the camera during rainfall 400 and is processed in a manner similar to that described below in regards to the image based rainfall estimation process 700. In an example, the image is processed to detect blurriness of objects on the other side of the proper irrigation spray pattern 540 and that blurriness is a basis for estimating an amount of irrigation fluid deployed by the first sprinkler head 504. In an example, a reduction in the fluid flow rate from a particular sprinkler head in order to identify the fluid pattern from that sprinkler had as a reduced flow image component. In an example, identifying a reduced flow image component results in characterizing that particular irrigation fluid spray component as a failed irrigation spray component.

The image 500 captured of an area during irrigation includes a person 520 within the area 502. In some examples, image processing of images capturing the area 502 that is performed by the irrigation controller 202, the security system 204, or both, is able to detect an image of a person 520 within the area 502 in captured images. In some examples, the presence of a person 520 in an area 502 for a determined about of time causes the irrigation controller 202 to provide irrigation to the irrigation zone to be activated and water to spray in that irrigation zone. In various examples, image processing is able to identify a person 520, animal, other unauthorized entrants into the area 502, or combinations of these, and the irrigation system in the area 502 is activated to encourage the entrant to leave.

Figure 6:
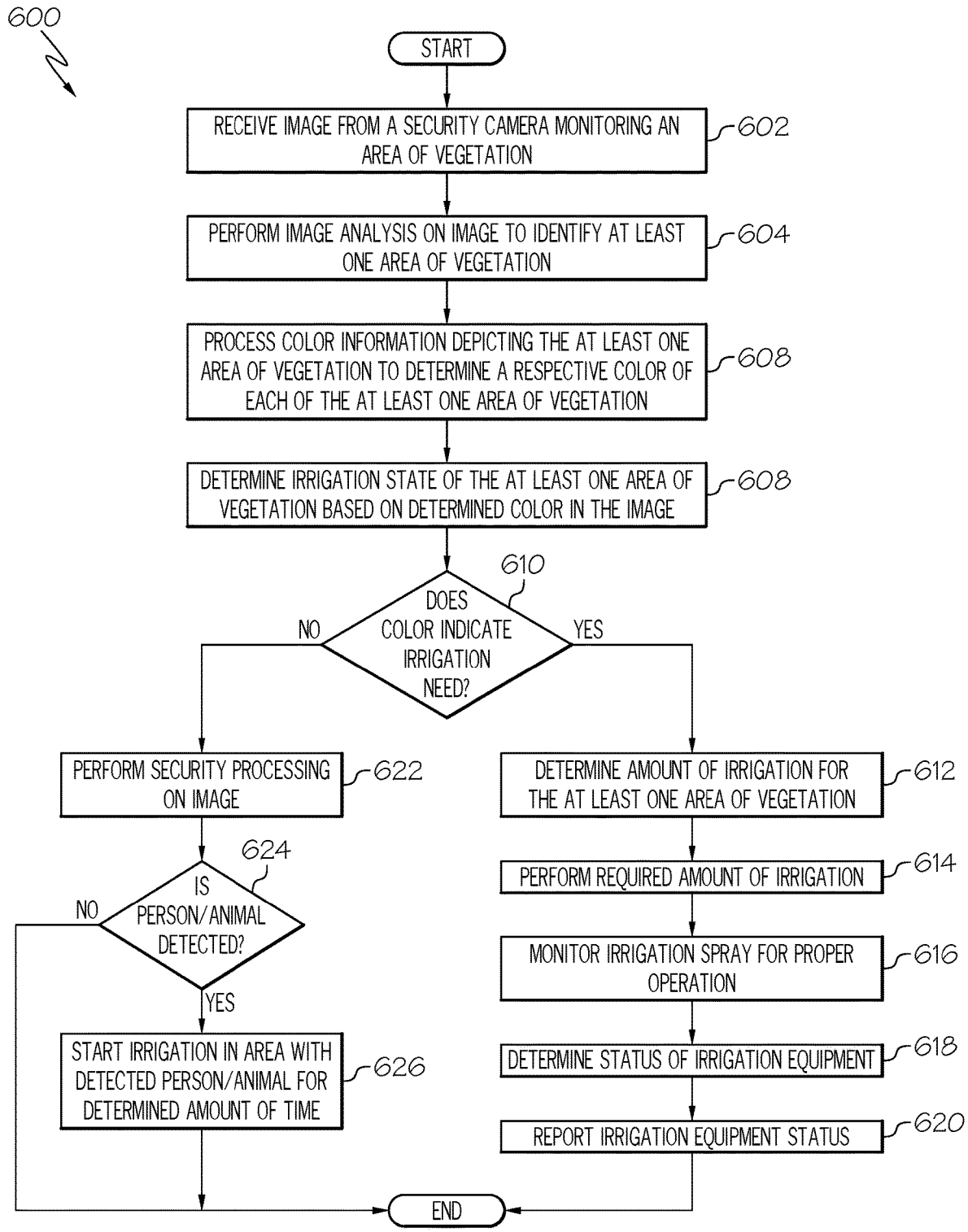
FIG. 6 illustrates an automated image based irrigation control process, according to an example.

FIG. 6 illustrates an automated image based irrigation control process 600, according to an example. The following description of the automated image based irrigation control process 600 refers to the interoperating security system and automated irrigation control system 200 discussed above. The automated image based irrigation control process 600 is an example of a process performed by the irrigation controller 202 discussed above.

The automated image based irrigation control process 600 receives, at 602, an image from a security camera monitoring an area of vegetation. In an example, the image is received from one of the area monitoring cameras 208, which are cameras that also provide images to the security system 204. In general, the automated image based irrigation control process 600 is able to receive images from any number of cameras and all of those images are processed as is described below.

Image analysis is performed on the received image, at 604, to identify at least one area of vegetation in the image. In an example, the image analysis processes pixel information in the image and identifies area of vegetation, such as grass, shrubs, trees, other vegetation, or combinations of these, based on known shapes of vegetation, based on colors of areas in the captured images, based on any other criteria, or combinations of these.

Color information depicting the at least one area of vegetation in the received image is processed, at 606, to determine a respective color of each of the at least one area of vegetation. In an example, this processing processes color information within the pixel information depicting the at least one area of vegetation. Determining the color of respective areas of vegetation in an example is used to determine an amount of irrigation fluid to provide to the area of vegetation. For example, the color of vegetation in an area may have a color that ranges from green, which may indicate the vegetation is well irrigated, to brown, indicating that the area needs more irrigation. In some examples, the color of the vegetation in an area may vary within the area and information such the size of brown areas relative to green areas in the vegetation, the depth of brown colors of vegetation, other color information, or combinations of these, are determined in order to support determining irrigation needs for the area.

The respective irrigation state of each at least one area of vegetation is determined, at 608, based on the determined color of the respective area of vegetation. In various examples, any one or more color based criteria are able to be used to determine irrigation state. In an example, determining the color of the vegetation in a range between green and brown can be used to determine the state of irrigation for the vegetation and whether more irrigation is needed. In some examples, vegetation has different colors besides green when well irrigated and brown when not well irrigated and the irrigation state of such vegetation is determined based on colors that are exhibited by that particular type of vegetation. In an example, a determined irrigation state of an area of vegetation is a basis for determining a determined irrigation need for that area of vegetation.

A determination is made, at 610, as to whether the color of particular area of vegetation indicates a need for irrigation. Such a determination in an example includes evaluating an amount of brown color in the area of vegetation relative to an amount of green color in that area.

If the determination is that the color of the particular area of vegetation indicates a need for irrigation, an amount of irrigation is determined, at 612, for the at least one area of vegetation. In an example, one or more of the darkness of brown areas in the vegetation or lightness of green areas in the vegetation are used to estimate a need for irrigation in that area. In an example, determining that a respective color of each of the at least one area of vegetation indicates that the each of the at least one area of vegetation has received one of too much irrigation or too little irrigation.

In an example, the required amount of irrigation is performed, at 614. Irrigation in an example is performed by activating irrigation valves 220 to activate irrigation equipment in the irrigation zone within the irrigation zones 230 that corresponds to the vegetation whose irrigation state is determined. Activating irrigation valves 220 is an example of controlling the irrigation system in a manner that includes providing more irrigation based on determining the each of the at least one area of vegetation received too little irrigation, and providing less irrigation based on determining the each of the at least one area of vegetation received too much irrigation.

The irrigation spray is monitored, at 616, for proper operation of the irrigation equipment. In an example, such monitoring is performed by receiving images, such as from one of the cameras 208, that contain views of the area of vegetation receiving irrigation while the irrigation system is providing irrigation fluid to that area of vegetation. The above described image 500 contained in FIG. 5 is an example of an image that contain views of the area of vegetation receiving irrigation while the irrigation system is providing irrigation fluid to that area of vegetation.

Status of irrigation equipment is determined, at 618. In some examples, malfunctioning irrigation equipment is able to be identified by processing received images that are captured of areas where the irrigation equipment is operating. An example is depicted with regards to the image 500, where image processing is able to identify 1) a broken spray pattern 580 produced by the third sprinkler head 508 in the image 500, 2) no water flow from the second sprinkler head 506, and 3) the proper irrigation spray pattern 540 produced by the first sprinkler head 504. Based on these detected image components, the status of irrigation is able to be determined. The irrigation equipment status is then reported, at 620. The irrigation equipment status is able to be reported by, for example, providing information to maintenance monitoring computers, sending electronic messages such as e-mail or text messages to specified addresses, sending images to specified destinations such as monitoring computers, electronic messaging addresses, sending any other type of data to specified destinations, or combinations of these. The automated image based irrigation control process 600 then ends.

Returning to the determination, at 610, of whether the color of vegetation indicates a need for irrigation, if that determination is negative in an example, the automated image based irrigation control process 600 continues, at 622, with security image processing on the image received from the cameras 208 supporting security operations. In an example, security image processing is performed by the image recognition processing component 242, described above, and identifies images of persons, animals, other image components, or combinations of these, within the captured images. In an alternative example, security processing of received images is able to be performed by any one or more processors, such as processors that are part of the security system 204, other processors, or combinations of these.

A determination is made, at 624, as to whether a person, animal, or other image component is detected that is associated with a security event. Types of image components that are associated with security events are able to be defined as any image components that are able to be specified or defined by any suitable technique.

In an example, if a person or animal is detected that is associated with a security event, the irrigation system is started, at 626, in the area where the person or animal is detected. In some examples, the irrigation is started only after the person or animal is detected to be within the area for a determined amount of time. In some examples, once the irrigation system is started, it remains on for a time duration that is determined according to any suitable criteria. In some examples, once the irrigation system is started, it is turned off based on either detecting that the person or animal has left the area, it is turned off after a specified time duration, it is turned off based on any other one or more suitable criteria, or based on combinations of these. After starting the irrigation system, at 626, or if it was determined that there was no person or animal detected in the received image, at 624, the automated image based irrigation control process 600 ends.

Figure 7:
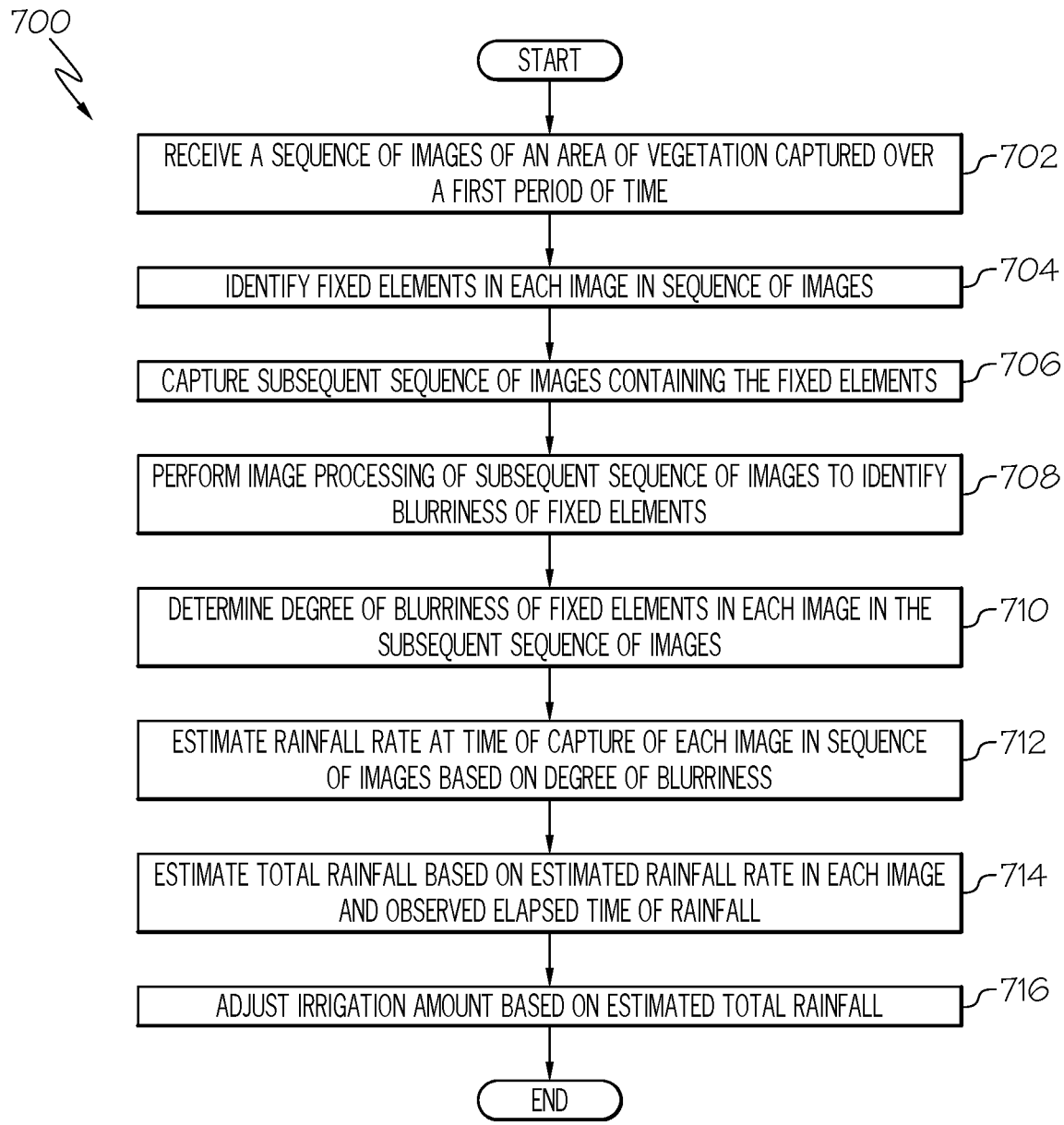
FIG. 7 illustrates an image based rainfall estimation process, according to an example.

FIG. 7 illustrates an image based rainfall estimation process 700, according to an example. Reference is made to the interoperating security system and automated irrigation control system 200 discussed above. In an example, the image based rainfall estimation process 700 is performed by the rain intensity processing component 228 discussed above.

The image based rainfall estimation process 700 receives, at 702, a sequence of images of an area of vegetation that is captured over a first period of time. In an example, the first period of time occurs while there is no rain occurring in the captured images. An example of an image captured during a first time period is described above with regards to the rain-free view captured by a camera 300 of FIG. 3.

Fixed elements in each of the received images in the sequence of images are identified, at 704. Examples of fixed elements include the walkway 130 and part of the fence 150, including the first fence post 132, the second fence post 134, the third fence post 136, and the fourth fence post 138. In an example, the fixed elements in a sequence of captured images can be identified because those elements do not move within the image over the first time period. In some examples, the length of the first time period is determined based on the anticipated speed of movement of objects in the received captured images. For example, processing capturing images of a parking lot with cars that are parked for long periods of time but that move over a period of days or weeks may process images captured over several days or weeks to identify fixed elements.

A subsequent sequence of images containing the fixed elements is captured, at 706. In some examples, the subsequent sequence of images is captured by the camera that captured the sequence of images during the first period of time. In further examples, other cameras are able to capture the subsequent sequence of images. In general, a subsequent sequence of images containing the fixed elements is able to be captured at any time after the first period of time.

Image processing of the subsequent sequence of images is performed, at 708, to identify blurriness of the captured images of the fixed elements. In an example, identifying blurriness of the images of fixed elements is a basis for determining an intensity of rainfall in the area between the fixed elements and the camera capturing the subsequent sequence of images. In an example, the image processing identifies a degree of blurriness of the fixed object and based on heuristic analyses estimates an amount of rainfall that is falling at that time. An example of such image processing is described above with respect to the view captured by the camera during rainfall 400.

The degree of blurriness of fixed elements in each image in the subsequent sequence of images is determined, at 710. The degree of blurriness is determined in an example by comparison of images of edges of objects contained in images captured during rainfall to images of the same edges captured when no rainfall is present, such as in the rain-free view captured by a camera 300 discussed above.

An estimate of the rainfall rate at the time of capture of each image in the sequence of images is determined, at 712, based on the estimated degree of blurriness. Heuristic image processing is used in an example to make such an estimate.

The total rainfall based on estimated rainfall rate in each image and observed elapsed time of the rainfall is estimated, at 714. The total amount of rainfall is estimated based on summing a product of the rainfall rate estimated in each image and the time interval between capturing each image.

Irrigation amounts are then adjusted, at 706, based on the estimated rainfall amount. Irrigation amounts are adjusted in an example by increasing irrigation time durations, irrigation frequencies, or both, when there is determined to be less rainfall, and decreasing these quantities when there is a determination of a greater amount of rainfall.

Figure 8:
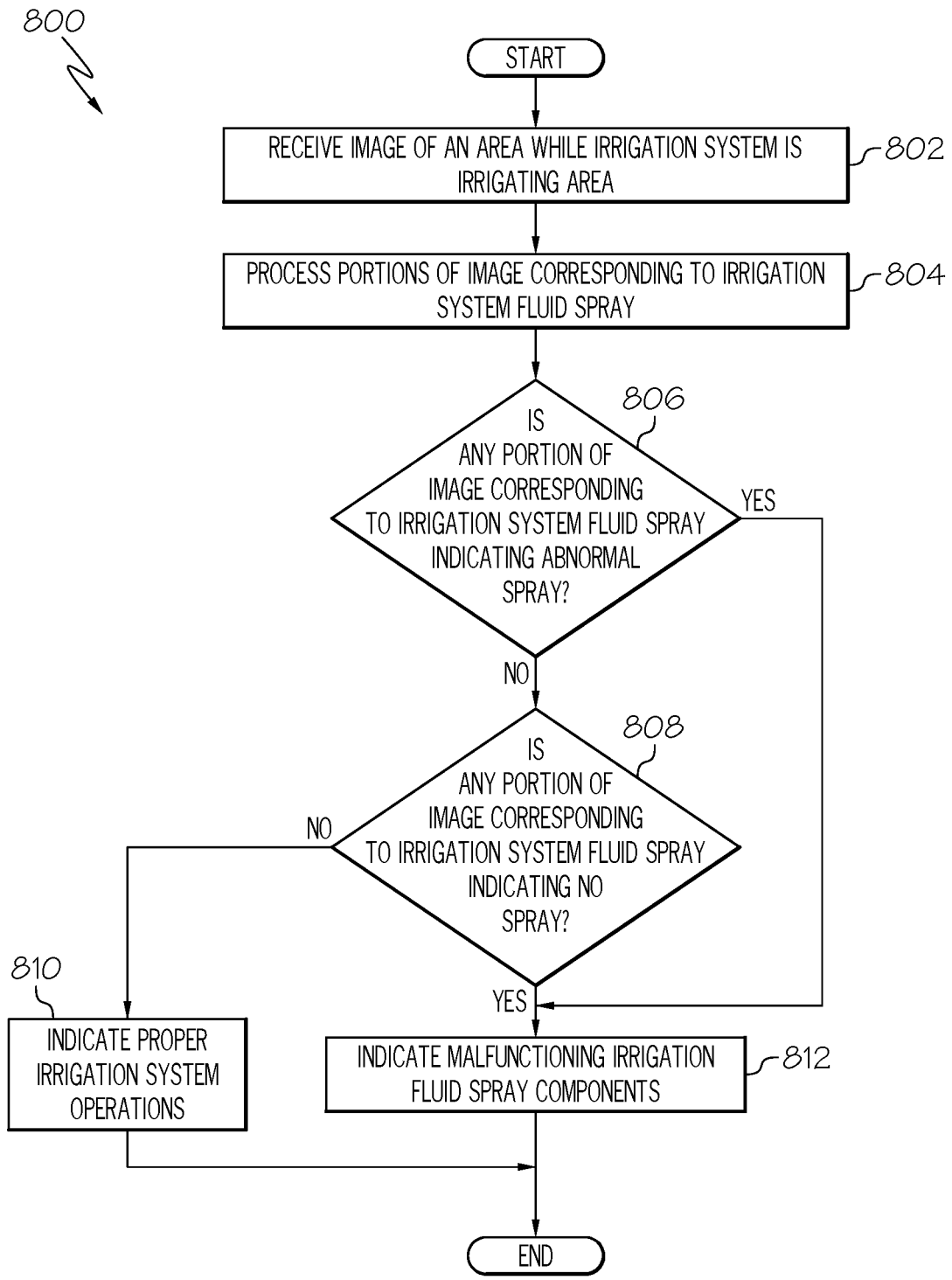
FIG. 8 illustrates an irrigation system image based failure detection process, according to an example.

FIG. 8 illustrates an irrigation system image based failure detection process 800, according to an example. Reference is made to the interoperating security system and automated irrigation control system 200 discussed above.

An image is received, at 802, of an area while the irrigation system is irrigating the area. An example of such a received image is discussed above with regards to the image 500 that is captured of an area during irrigation. As discussed above, image 500 shows that the first sprinkler head 504 has a proper irrigation spray pattern 540, the second sprinkler head 506 has no water flow, and the third sprinkler head 508 has a broken spray pattern 580.

Portions of the received image corresponding to irrigation system fluid spray are processed, at 804. In an example, the received image 500 is a failure detection image that is processed to identify and characterize irrigating fluid spray image components such as the proper irrigation spray pattern 540 from the first sprinkler head, the no water flow from the second sprinkler head 506, and the broken spray pattern 580 from the third sprinkler head 508. In an example, processing of previously received images from the same area when the irrigation system is irrigating the area are used to automatically determine locations of sprinkler heads and expected spray patterns.

A determination is made, at 806, as to whether any portion of the image corresponding to irrigation system fluid spray indicates abnormal spray. In an example, the portions of the received images that correspond to irrigation system fluid spray that are processed above are compared to expected spray patterns that were identified in previously captured and processed images are a basis for determining any abnormal spray patterns.

If no portion of the image indicates abnormal spray, a determination is made, at 808, as to whether any portion of the image corresponding to irrigation system fluid spray indicates no spray. In an example, the portions of the received images that correspond to irrigation system fluid spray that are processed above are compared to expected spray patterns that were identified in previously captured and processed images to determine if there is an absence of a spray where a spray is expected. If portions of the image are determined to indicate no spray, proper irrigation system operations are indicated, at 810. The irrigation system image based failure detection process 800 then ends.

Returning to the determination, at 806, as to whether any portion of the image indicates abnormal spray, if this determination is that one or more portions indicate an abnormal spray, or if the determination, at 808, determines that no portion of the image indicates no spray, malfunctioning irrigation fluid spray components are indicated, at 812. The irrigation system image based failure detection process 800 then ends.

Indications of proper irrigation system operations, at 810, or malfunctioning irrigation fluid spray components, at 812, are able to be made in any suitable way. In some examples, a text or e-mail message is sent to a specified address. In some examples, images of the operating irrigation components, including irrigation components that are determined to be operating properly or that are determined to be malfunctioning, or both, are also able to be stored for later review, sent with electronically communicated indications, utilized in any suitable way, or combinations of these.

Figure 9:
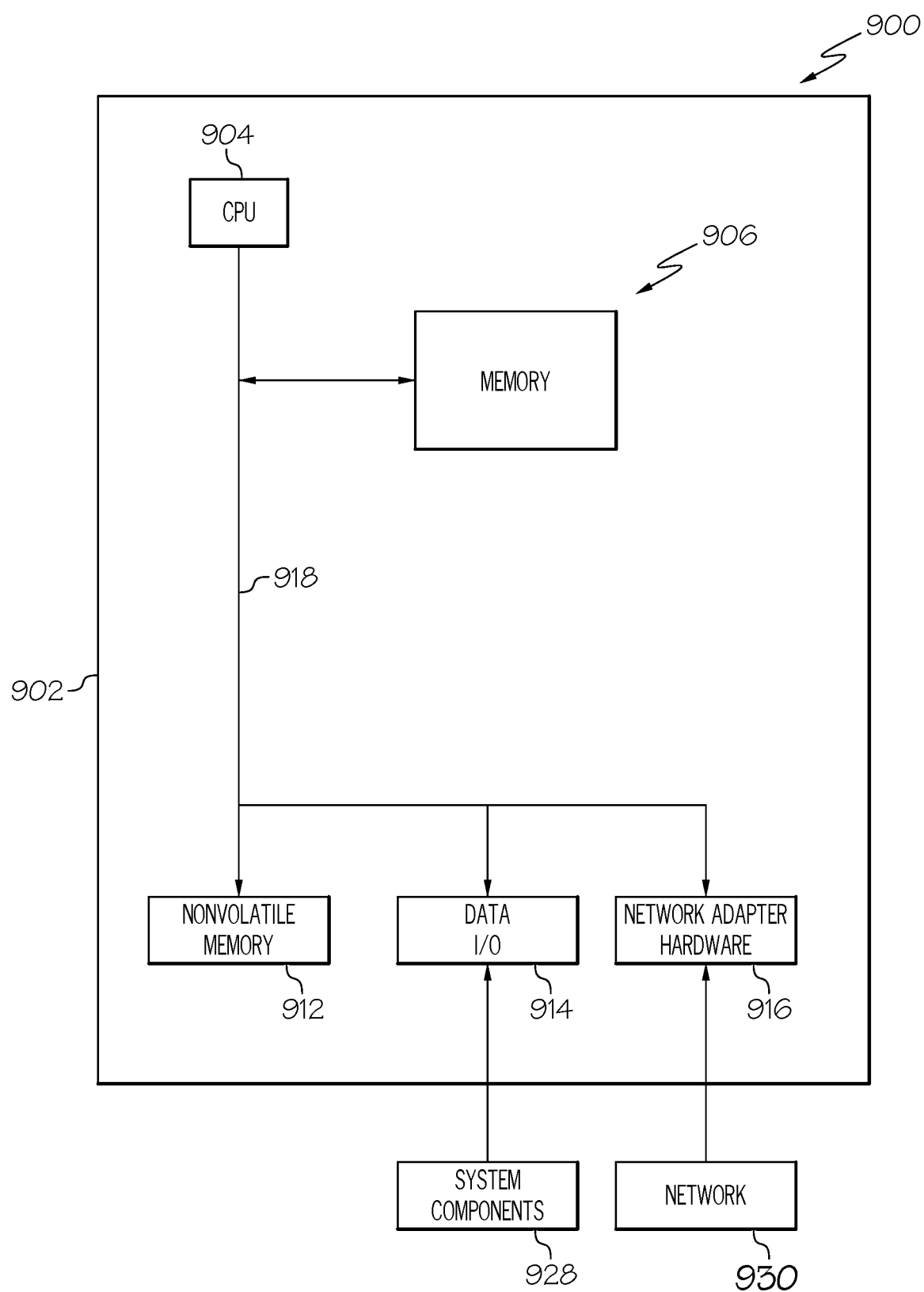
FIG. 9 illustrates a block diagram illustrating a processor, according to an example.

FIG. 9 illustrates a block diagram illustrating a processor 900 according to an example. The processor 900 is an example of a processing subsystem that is able to perform any of the above described processing operations, control operations, other operations, or combinations of these.

The processor 900 in this example includes a CPU 904 that is communicatively connected to a main memory 906 (e.g., volatile memory), a non-volatile memory 912 to support processing operations. The CPU is further communicatively coupled to a network adapter hardware 916 to support input and output communications with external computing systems such as through the illustrated network 930.

The processor 900 further includes a data input/output (I/O) processor 914 that is able to be adapted to communicate with any type of equipment, such as the illustrated system components 928. The data input/output (I/O) processor in various examples is able to be configured to support any type of data communications connections including present day analog and/or digital techniques or via a future communications mechanism. A system bus 918 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for controlling irrigation of an area, the method comprising:
   receiving, from a video camera supporting security monitoring of a premises, a time sequence of images of an area of vegetation in the premises
      where the time sequence of images captures images of at least one area of vegetation and captures images of an object that is farther from the video camera than the at least one area of vegetation,
      wherein the time sequence of images comprises:
         a first sub-sequence of images captured when no rain is present in the at least one area of vegetation; and
         a second sub-sequence of images captured when rain is present in the at least one area of vegetation,
      wherein the video camera provides image data to both a security monitoring system and an irrigation control system;
   identifying, based on processing pixel information in the time sequence of images, the at least one area of vegetation within the image;
   processing color information within the pixel information depicting the at least one area of vegetation within the time sequence of images to determine a respective color of each of the at least one area of vegetation;
   determining, based on the respective color of the at least one area of vegetation, a respective irrigation state of each of the at least one area of vegetation;
   processing images in the first sub-sequence of images to identify at least one fixed object and at least one edge in the images;
   comparing pixel information within images in the second sub-sequence of images to pixel information within the first sub-sequence of images to identify respective amounts of blurriness at points on the at least one fixed object and the at least one edge within images in the second sub-sequence of images;
   estimating, based on the respective amounts of blurriness at points on the at least one fixed object and of the at least one edge, an estimated distance between the video camera and points on the at least one fixed object, and between the video camera and points on the at least one edge;
   estimating, based on the respective amounts of blurriness at points on the at least one fixed object and of the at least one edge, the estimated distance, and a respective time duration between capture of each image in the second sub-sequence of images, a total amount of rainfall falling on the at least one area of vegetation during capturing of the second sub-sequence of images;
   determining a determined irrigation need that exists at a time after capturing of the second sub-sequence of images for the at least one area of vegetation based on the respective irrigation state of each of the at least one area of vegetation and further based on the total amount of rainfall during capturing of the second sub-sequence of images; and
   controlling, based on the determined irrigation need, an irrigation system to provide irrigation fluid to the at least one area of vegetation, where the controlling is independent of a set irrigation schedule.

2. The method of claim 1, further comprising:
   receiving, from the video camera, an irrigation flow detection image sequence of the at least one area of vegetation while irrigating the at least one area of vegetation, where the irrigation flow detection image sequence captures an image of the object;
   processing the irrigation flow detection image sequence to identify, within each image of the irrigation flow detection image sequence, irrigating fluid spray image components of an irrigation fluid spray that is between the video camera and at least one of the at least one fixed object and the at least one edge;
   comparing pixel information within each image of the irrigation flow detection image sequence to pixel information within the first sub-sequence of images to identify, in each respective image, a respective irrigation flow amount of blurriness at points on the at least one fixed object and the at least one edge within the irrigating fluid spray image components within each image of the irrigation flow detection image sequence; and
   estimating, based on the respective irrigation flow amount of blurriness at points on the at least one fixed object and on the at least one edge within each respective image of the irrigation flow detection image sequence, and a respective time duration between capture of each image in the irrigation flow detection image sequence, a total amount of irrigation fluid delivered to the at least one area of vegetation during capturing of the irrigation flow detection image sequence,
   wherein the controlling the irrigation system comprises determining a length of time to provide irrigation based on the estimating the total amount of irrigation fluid delivered to the at least one area of vegetation during capturing of the irrigation flow detection image sequence.

3. The method of claim 1, further comprising:
   receiving a failure detection image of the at least one area of vegetation while irrigating the at least one area of vegetation;
   processing the failure detection image to identify irrigating fluid spray image components;
   characterizing each irrigating fluid spray image component in the irrigation fluid spray image components as one of a regular operating irrigation spray image or a failed irrigation spray image; and
   identifying an irrigation component failure based on characterizing an identified irrigation fluid spray image component as a failed irrigation component.

4. The method of claim 3, wherein characterizing a particular irrigation fluid spray component as a failed irrigation spray image comprises identifying the particular irrigation fluid spray component as a reduced flow image component.

5. The method of claim 3, wherein characterizing a particular irrigation fluid spray component as a failed irrigation spray image comprises identifying the particular irrigation fluid spray component as a broken spray pattern.

6. The method of claim 1, further comprising receiving a plurality of images comprising the image, each of the plurality of images being captured by a respective video camera within a plurality of video cameras, where each video camera captures images of a respective portion of the vegetation on the premises, and wherein the plurality of video cameras operates to capture images of all vegetation on the premises.

7. The method of claim 1, wherein determining the respective irrigation state of each of the at least one area of vegetation comprises determining that a respective color of each of the at least one area of vegetation indicates that the each of the at least one area of vegetation has received one of too much irrigation or too little irrigation, and
wherein controlling the irrigation system comprises:
providing more irrigation based on determining the each of the at least one area of vegetation received too little irrigation; and
providing less irrigation based on determining the each of the at least one area of vegetation received too much irrigation.

8. An irrigation control apparatus, comprising:
a video camera interface configured to, when operating, receive, from a video camera supporting security monitoring of a premises, a time sequence of images of an area of vegetation in the premises,
where the time sequence of images captures images of at least one area of vegetation and captures images of an object that is farther from the video camera than the at least one area of vegetation,
wherein the time sequence of images comprises:
a first sub-sequence of images captured when no rain is present in the at least one area of vegetation; and
a second sub-sequence of images captured when rain is present in the at least one area of vegetation,
wherein the video camera provides image data to both a security monitoring system and an irrigation control system;
an image processor, communicatively coupled to the video camera interface, the image processor configured to, when operating:
identify, based on processing pixel information in the time sequence of images, the at least one area of vegetation within the image;
process color information within the pixel information depicting the at least one area of vegetation within the time sequence of images to determine a respective color of each of the at least one area of vegetation;
determine, based on the respective color of the at least one area of vegetation, a respective irrigation state of each of the at least one area of vegetation;
process images in the first sub-sequence of images to identify at least one fixed object and at least one edge in the images;
compare pixel information within images in the second sub-sequence of images to pixel information within the first sub-sequence of images to identify respective amounts of blurriness at points on the at least one fixed object and the at least one edge within images in the second sub-sequence of images;
estimate, based on the respective amounts of blurriness at points on the at least one fixed object and of the at least one edge, an estimated distance between the video camera and points on the at least one fixed object, and between the video camera and points on the at least one edge;
estimate, based on the respective amounts of blurriness at points on the at least one fixed object and of the at least one edge, the estimated distance, and a respective time duration between capture of each image in the second sub-sequence of images, a total amount of rainfall falling on the at least one area of vegetation during capturing of the second sub-sequence of images; and
determine a determined irrigation need that exists at a time after capturing of the second sub-sequence of images for the at least one area of vegetation based on the respective irrigation state of each of the at least one area of vegetation and further based on the total amount of rainfall during capturing of the second sub-sequence of images; and
an irrigation controller, communicatively coupled to the image processor, the irrigation controller configured to, when operating, control, based on the determined irrigation need, an irrigation system to provide irrigation fluid to the at least one area of vegetation, where the controlling is independent of a set irrigation schedule.

9. The irrigation control apparatus of claim 8, wherein the image processor is further configured to, when operating:
receive, from the video camera, an irrigation flow detection image sequence of the at least one area of vegetation while irrigating the at least one area of vegetation, where the irrigation flow detection image sequence captures an image of the object;
process the irrigation flow detection image sequence to identify, within each image of the irrigation flow detection image sequence, irrigating fluid spray image components of an irrigation fluid spray that is between the video camera and at least one of the at least one fixed object and the at least one edge;
compare pixel information within each image of the irrigation flow detection image sequence to pixel information within the first sub-sequence of images to identify, in each respective image, a respective irrigation flow amount of blurriness at points on the at least one fixed object and the at least one edge within the irrigating fluid spray image components within each image of the irrigation flow detection image sequence; and
estimate, based on the respective irrigation flow amount of blurriness at points on the at least one fixed object and on the at least one edge within each respective image of the irrigation flow detection image sequence, and a respective time duration between capture of each image in the irrigation flow detection image sequence, a total amount of irrigation fluid delivered to the at least one area of vegetation during capturing of the irrigation flow detection image sequence,
wherein the irrigation controller is further configured to control the irrigation system by determining a length of time to provide irrigation based on an estimation of the total amount of irrigation fluid delivered to the at least one area of vegetation during capturing of the irrigation flow detection image sequence.

10. The irrigation control apparatus of claim 8, wherein the image processor is further configured to, when operating:
  receive a failure detection image of the at least one area of vegetation while irrigating the at least one area of vegetation;
  process the failure detection image to identify irrigating fluid spray image components;
  characterize each irrigating fluid spray image component in the irrigation fluid spray image components as one of a regular operating irrigation spray image or a failed irrigation spray image; and
  identify an irrigation component failure based on characterizing an identified irrigation fluid spray image component as a failed irrigation component.

11. The irrigation control apparatus of claim 10, wherein the image processor is configured to, when operating, characterize a particular irrigation fluid spray component as a failed irrigation spray image based on identifying the particular irrigation fluid spray component as a reduced flow image component.

12. The irrigation control apparatus of claim 10, wherein the image processor is configured to, when operating, characterize a particular irrigation fluid spray component as a failed irrigation spray image comprises identifying the particular irrigation fluid spray component as a broken spray pattern.

13. The irrigation control apparatus of claim 8, wherein the video camera interface is configured to, when operating, further receive a plurality of images comprising the image, each of the plurality of images being captured by a respective video camera within a plurality of video cameras, where each video camera captures images of a respective portion of the vegetation on the premises, and wherein the plurality of video cameras operates to capture images of all vegetation on the premises.

14. The irrigation control apparatus of claim 8, wherein the image processor is configured to, when operating determine the respective irrigation state of each of the at least one area of vegetation based on determining that a respective color of each of the at least one area of vegetation indicates that the each of the at least one area of vegetation has received one of too much irrigation or too little irrigation, and
  wherein the irrigation controller is further configured to, when operating, control the irrigation system by at least:
    providing more irrigation based on determining the each of the at least one area of vegetation received too little irrigation; and
    providing less irrigation based on determining the each of the at least one area of vegetation received too much irrigation.

15. A computer program product for controlling irrigation to an area, the computer program product comprising:
  a computer readable storage medium having computer readable program code embodied therewith, the computer readable program code comprising instructions for:
  receiving, from a video camera supporting security monitoring of a premises, a time sequence of images of an area of vegetation in the premises
    where the time sequence of images captures images of at least one area of vegetation and captures images of an object that is farther from the video camera than the at least one area of vegetation,
    wherein the time sequence of images comprises:
      a first sub-sequence of images captured when no rain is present in the at least one area of vegetation; and
      a second sub-sequence of images captured when rain is present in the at least one area of vegetation,
    wherein the video camera provides image data to both a security monitoring system and an irrigation control system;
  identifying, based on processing pixel information in the time sequence of images, the at least one area of vegetation within the image;
  processing color information within the pixel information depicting the at least one area of vegetation within the time sequence of images to determine a respective color of each of the at least one area of vegetation;
  determining, based on the respective color of the at least one area of vegetation, a respective irrigation state of each of the at least one area of vegetation;
  processing images in the first sub-sequence of images to identify at least one fixed object and at least one edge in the images;
  comparing pixel information within images in the second sub-sequence of images to pixel information within the first sub-sequence of images to identify respective amounts of blurriness at points on the at least one fixed object and the at least one edge within images in the second sub-sequence of images;
  estimating, based on the respective amounts of blurriness at points on the at least one fixed object and of the at least one edge, an estimated distance between the video camera and points on the at least one fixed object, and between the video camera and points on the at least one edge;
  estimating, based on the respective amounts of blurriness at points on the at least one fixed object and of the at least one edge, the estimated distance, and a respective time duration between capture of each image in the second sub-sequence of images, a total amount of rainfall falling on the at least one area of vegetation during capturing of the second sub-sequence of images;
  determining a determined irrigation need that exists at a time after capturing of the second sub-sequence of images for the at least one area of vegetation based on the respective irrigation state of each of the at least one area of vegetation and further based on the total amount of rainfall during capturing of the second sub-sequence of images; and
  controlling, based on the determined irrigation need, an irrigation system to provide irrigation fluid to the at least one area of vegetation, where the controlling is independent of a set irrigation schedule.

16. The computer program product of claim 15, wherein the computer readable program code further comprises instructions for:
  receiving, from the video camera, an irrigation flow detection image sequence of the at least one area of vegetation while irrigating the at least one area of vegetation, where the irrigation flow detection image sequence captures an image of the object;
  processing the irrigation flow detection image sequence to identify, within each image of the irrigation flow detection image sequence, irrigating fluid spray image components of an irrigation fluid spray that is between the video camera and at least one of the at least one fixed object and the at least one edge;
  comparing pixel information within each image of the irrigation flow detection image sequence to pixel information within the first sub-sequence of images to identify, in each respective image, a respective irrigation flow amount of blurriness at points on the at least one fixed object and the at least one edge within the irrigating fluid spray image components within each image of the irrigation flow detection image sequence; and estimating, based on the respective irrigation flow amount of blurriness at points on the at least one fixed object and on the at least one edge within each respective image of the irrigation flow detection image sequence, and a respective time duration between capture of each image in the irrigation flow detection image sequence, a total amount of irrigation fluid delivered to the at least one area of vegetation during capturing of the irrigation flow detection image sequence, wherein the controlling the irrigation system comprises determining a length of time to provide irrigation based on the estimating the total amount of irrigation fluid delivered to the at least one area of vegetation during capturing of the irrigation flow detection image sequence.

17. The computer program product of claim 15, wherein the computer readable program code further comprises instructions for:

receiving a failure detection image of the at least one area of vegetation while irrigating the at least one area of vegetation;

processing the failure detection image to identify irrigating fluid spray image components;

characterizing each irrigating fluid spray image component in the irrigation fluid spray image components as one of a regular operating irrigation spray image or a failed irrigation spray image; and identifying an irrigation component failure based on characterizing an identified irrigation fluid spray image component as a failed irrigation component.

\* \* \* \* \*